United States Patent Office 3,411,984
Patented Nov. 19, 1968

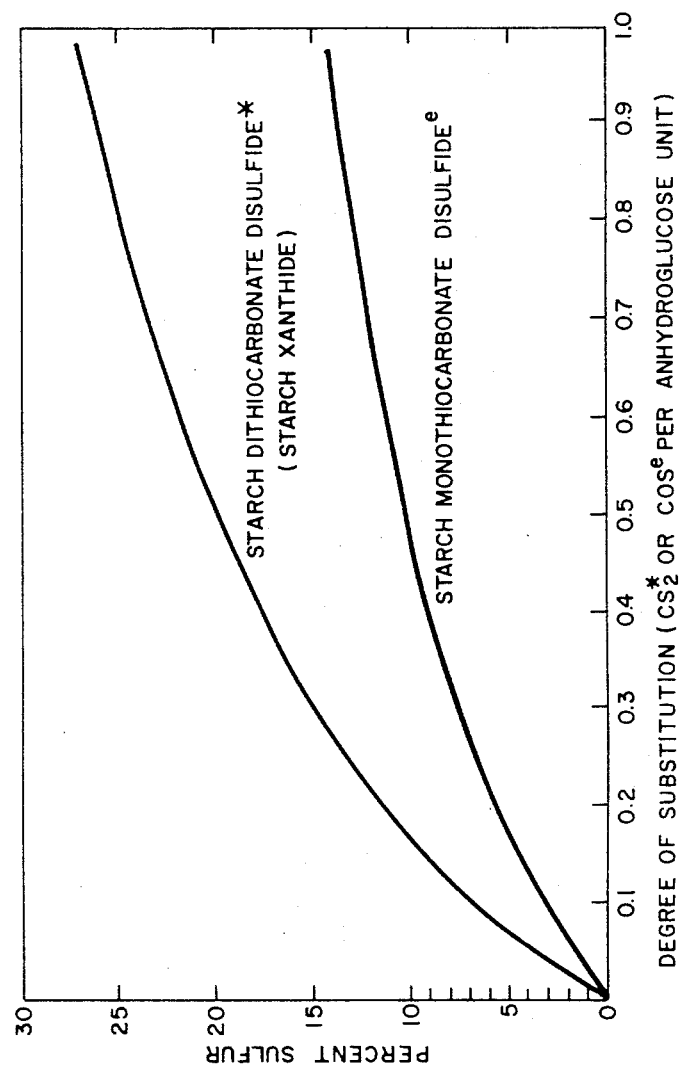

3,411,984
STARCH MONOTHIOCARBONATE DISULFIDE
AND PROCESS FOR USING SAME IN PAPER
Mamerto M. Cruz, Pennington, N.J., assignor to
FMC Corporation, New York, N.Y., a corporation of Delaware
Filed Sept. 27, 1965, Ser. No. 490,287
6 Claims. (Cl. 162—175)

ABSTRACT OF THE DISCLOSURE

A novel compound, a starch monothiocarbonate disulfide having the formula:

$$RO-\overset{O}{\underset{\parallel}{C}}-S-S-\overset{O}{\underset{\parallel}{C}}-OR$$

wherein RO represents the α-anhydroglucose units of a starch molecule, has been found useful as an additive to paper in amounts of at least about 1% by weight of the dry pulp (and preferably 2 to 5%) to increase both the wet and dry strength of the paper and otherwise improve its physical properties. This novel product can be produced by oxidizing starch dithiocarbonate disulfide (starch xanthide) with about stoichiometric amounts of chlorine dioxide.

---

This invention relates to starch monothiocarbonate disulfide (MTDS) and, more specifically, to the production and use of this compound to produce an improved paper.

It is known that certain cross-linked xanthates of a cereal grain material such as the cereal flour of whole wheat, bran and other such common starches can be used to improve the properties of paper. In these applications the cereal is first reacted with $CS_2$ and caustic to form a cereal xanthate having the formula:

$$RO-\overset{S}{\underset{\parallel}{C}}-SNa$$

where RO refers to α-anhydroglucose units of starch. This cereal xanthate is then mixed with an aqueous pulp and the xanthate is converted into a starch dithiocarbonate disulfide (starch xanthide) in-situ by using an oxidizing agent such as iodine or hypochlorite. This reaction occurs as follows:

$$2RO-\overset{S}{\underset{\parallel}{C}}-SNa \xrightarrow{\text{oxidizing agent}} RO-\overset{S}{\underset{\parallel}{C}}-S-S-\overset{S}{\underset{\parallel}{C}}-OR$$

where RO refers to α-anhydroglucose units of starch.

The resulting insoluble starch xanthide swells, and adheres as a coating onto the cellulosic fibers of the wood pulp in the dispersion. Thereafter, when the pulp is formed into paper the starch xanthide precipitate bonds the pulp fibers together in the finished, dried, paper sheet.

One serious problem that has arisen in the use of cereal xanthates is the extremely poor stability of these compounds. This necessitates producing the xanthates on demand just prior to being used. The xanthates cannot be produced in one location and then stored until ready for use in another location. This is inconvenient and makes operation difficult because the production of xanthates must be varied to coincide with the fluctuating demands for the final paper product.

Other known techniques for increasing the strength of paper include the use of certain cellulose xanthates as additives to paper. These additives which have the formula $$R^1-O-\overset{S}{\underset{\parallel}{C}}-SNa$$

wherein $R^1$ refers to β-anhydroglucose units, operate in a different fashion than cereal derivatives described above. In this instance, the cellulose which is highly insoluble in water is converted to a water-soluble cellulose xanthate and introduced into paper as a tub-sizing additive. A portion of the cellulose xanthate remains on the cellulose fibers of the paper. The wet paper is then acidified and the water-soluble cellulose xanthate remaining on the paper is converted back to cellulose. The resulting film of cellulose formed in situ becomes intertwined with the cellulosic fibers of the paper and acts as a binding agent. In this process the cellulose gel must be precipitated in situ throughout the paper sheet as an interlocking part of the fibers of the paper because the cellulose does not swell and adhere to the paper fibers as does the cereal derived additives. This process has the drawback of using a relatively unstable cellulose xanthate with all the disadvantages inherent in having to produce the xanthate on demand.

As a result there is a need for a novel stable paper additive which will increase the strength of paper and which has sufficient stability to enable it to be produced and stored in a dry form without deteriorating prior to being used.

It is an object of the present invention to satisfy the above need.

It is a further object of the present invention to utilize a novel compound as a paper additive which is highly stable and which can be produced from starch xanthide.

It is a further object to describe a process for producing the present novel paper additive which is carried out easily and with a minimum of processing steps.

I have found that a novel compound, a starch monothiocarbonate disulfide having the formula:

$$RO-\overset{O}{\underset{\parallel}{C}}-S-S-\overset{O}{\underset{\parallel}{C}}-OR$$

wherein RO represents the α-anhydroglucose units of a starch molecule, is useful as an additive to paper in amounts of at least about 1% by weight of the dry pulp (and preferably 2 to 5%) to increase both wet and dry strength of the paper and otherwise improve its physical properties.

I have further found that this novel compound, starch monothiocarbonate disulfide, can be produced by oxidizing starch dithiocarbonate disulfide (starch xanthide) with about stoichiometric amounts of chlorine dioxide.

In carrying out the present invention a starch derived from a cereal grain such as corn, wheat, potato, tapioca, cassava or any starch containing material must first be converted to starch xanthide. In this conversion the starch is reacted with sodium hydroxide and carbon bisulfide to form starch xanthate. In this reaction the sodium hydroxide and carbon bisulfide are added to the starch in mole ratios, respectively, of at least 0.33:0.15 per mole of starch. The reaction is carried out at temperatures of about 10 to about 60° C. in a sealed chamber which prevents the escape of carbon bisulfide from the reaction chamber. The resultant starch xanthate has a DS (degree of substitution) of at least about 0.12. The DS expresses numerically the moles of carbon bisulfide that have reacted with 162 g. of flour.

The resulting product, starch xanthate, is then oxidized to starch xanthide by means of conventional oxidizing agents such as iodine or hypochlorite. In practice, this is carried out by first acidifying the solution of starch xanthate with an acid such as sulfuric, acetic, hydrochloric or any inorganic or organic acid to a pH not lower than about 5.5 and then adding sodium hypochlorite solution in an amount sufficient to convert the starch xanthate to starch xanthide. An excess of hypochlorite solution is normally used over the theoretical quantity required for conversion of the cereal xanthate groups to the cereal xanthide groups. Normally a molar ratio of sodium hypochlorite to the xanthate group of 1.5:1 to 1.9:1 has been found satisfactory in producing the starch xanthide. In this oxidation step the starch xanthate solution is normally maintained at a pH of between 5.5 and 7.5 preferably at a temperature of from 10° to 30° C. to avoid decomposing the xanthate groups. The above procedure for producing a starch xanthide is well known by those skilled in the art and is not intended to limit the source or the method of producing the starch xanthide used in the present invention.

In accordance with the present invention the starch xanthide is converted to a starch monothiocarbonate disulfide by treating the starch xanthide with chlorine dioxide at a temperature of from about 0° to 60° C. and at a pH of from about 1 to 6. The reaction tkaes place as follows:

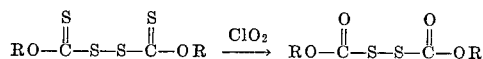

where RO refers to α-anhydroglucose units of starch.

Th reaction is carried out preferably at temperatures from about 10° to 30° C. and at a pH of about 3.5 to 4.5. These reaction temperatures are preferred because the chlorine dioxide is more soluble in the mixture at 10° to 30° C. and this prevents loss of $ClO_2$ which is required in the reaction. The chlorine dioxide is added preferably in a ratio of about 4 moles of $ClO_2$ per mole of xanthide group in the starch xanthide reactant. Smaller or larger amounts of $ClO_2$ may be added because any excess chlorine dioxide does not degrade the anhydroglucose units that make up the starch moiety of the present starch product. This reaction takes no more than six hours and is generally satisfactorily completed within three hours under the preferred temperatures and pH conditions specified above.

Upon completion of the reaction, starch monothiocarbonate disulfide is recovered as a white powder which is stable and which can be stored without breakdown of the monothiocarbonate disulfide groups. The degree of substitution of the starch molecules with monothiocarbonate disulfide groups is set forth in the attached drawing as a function of the percent sulfur in the final composition. A DS of at least about 0.12 is normally desired.

In the drawing a graphic illustration of the relationship of sulfur content to a degree of substitution is set forth for both starch dithiocarbonate disulfide (starch xanthide) and for starch monothiocarbonate disulfide.

In the drawing the vertical axis sets forth the percent of sulfur which is present in the compounds, while the horizontal axis sets forth the degree of substitution per anhydroglucose unit. As will be seen from the graph, starch monothiocarbonate disulfide having a sulfur content of above about 3% has a degree of substitution of about 0.1. This is about the minimum degree of substitution which is desired in order to obtain a commercial product which is useful as a paper additive to increase the strength of the paper.

In carrying out the oxidation of starch xanthide to starch monothiocarbonate disulfide the use of chlorine dioxide is necessary in order to carry out this oxidation without substantially degrading the anhydroglucose moiety of the resultant product. This oxidizing agent appears to be unique in being able to selectively oxidize the starch xanthide to the desired product without degrading the starch moiety. Moreover, many well-known oxidizing agents such as iodine, chlorine, hydrogen peroxide and peracetic acid will not oxidize the starch xanthide to the present product. The reasons for obtaining selective oxidation with chlorine dioxide are not known, but thus far $ClO_2$ is the only workable oxidizing agent which has been found to yield the desired novel product without degrading it.

The resultant starch monothiocarbonate disulfide product is recovered as a white powder insoluble in water and which has much greater stability than either starch xanthate or starch xanthide. This product is used in accordance with the present process as an additive to pulp slurries during the process of making paper and to increase the strength of the resultant paper. In this application the starch monothiocarbonate disulfide is added preferably in amounts of from 2 to 5% (based on the weight of subsequently added pulp) to water and finely dispersed in the water to form a colloidal dispersion. The required amount of pulp is then added and is intimately mixed to form a pulp slurry in known manner. This slurry is then used to make up paper by passing the slurry through a screen on which the cellulosic fibers and particles of the starch monothiocarbonate disulfide remain while the water passed therethrough. The particles of starch monothiocarbonate disulfide which are dispersed throughout the paper swell in the presence of the water, adhere to the pulp fibers and bind these fibers wherever they intersect one another during the formation of the resulant paper. As the paper is dried the particles of starch monothiocarbonate disulfide remain as a binding agent and increase the strength of the resultant dried paper.

In the above description the starch monothiocarbonate disulfide was used alone as an additive to increase the dry strength of the paper. In addition, the starch monothiocarbonate disulfide can also be used along with a cationic resin to increase the wet or dry strength of the paper. The cationic resin stabilizes the novel starch derivative on the paper fibers. The stabilizing effect is obtained because the cationic resin fixes the starch derivative on the paper fiber in its swollen state. On drying the particles of starch monothiocarbonate disulfide are less subject to swelling on contact with water, thereby retaining wet strength properties. When the starch monothiocarbonate disulfide additive is stabilized on the paper product by means of a cationic resin, it materially increases the wet strength of the resultant paper.

The following examples are given to illustrate the present invention and are not deemed to be limiting thereof.

Example 1

One hundred eighty grams of corn starch (containing 10% moisture) were mixed with 100 ml. of ice-cold water in a blender for ten minutes. The jacket temperature of the blender during the mixing was maintained at 10° C. Two hundred grams of 20% NaOH (1 mole) were added gradually to the starch and the mixture blended for an hour. Additional ice-cold water was added and mixed with the starch until a translucent homogeneous paste was formed. The temperature of the jacket surrounding the blender was raised to 25° C. and 45.5 g. of carbon bisulfide (0.6 moles) was added to the mix. A plexiglass cover was secured over the opening of the mixer to prevent the loss of carbon bisulfide and the mixture was blended for one hour. A yellow-orange viscous mix (cereal xanthate) was obtained, cooled to 10° to 15° C. in the blender, and diluted with 300 g. of ice-cold, deionized water. The resulting viscous solution was acidified by dropwise addition of 160 to 180 ml. of an ice-cold 10% acetic acid solution. The viscous solution was transferred to a 5 liter polyethylene container and deionized water was added to give the final concentration of about 95 g./l. Thereafter 1994 ml. of NaOCl solution (1.5 moles) was added with vigorous mixing. The temperature of the mixture was maintained at 25° C. by occasional addition of crushed ice. The pH of the mixture was maintained at about 5.5 during the 30 minute reaction period. A discrete yellowish white precipitate was formed and this was washed free of salts in water, filtered and washed with isopropanol and then air dried. The resultant product, starch xanthide, was found to contain 7.61% sulfur.

The above precipitate was added to sufficient deionized water to form a suspension containing 95 g./l. of water.

A solution containing 62 g. of technical grade $NaClO_2$ per liter was prepared (29.6 g. of $ClO_2$ per liter). Two hundred milliliter portions of this alkaline solution were acidified to a pH of 5.5 to 6.5 with 10% acetic acid solution and added to the xanthide slurry with constant mixing. The rate of addition of the $ClO_2$ solution was controlled potentiometrically throughout a three-hour reaction period to maintain an excess of $ClO_2$ in the mixture.

A total of 700 ml. of the acidified solution was added. At the end of the reaction the slurry was treated with about 3 g. of sodium sulfite to destroy the residual chlorine dioxide and filtered. The product was purified by repeated washings with water to obtain a neutral product which was given a final wash with acetone and then air dried. A white powdery product was obtained having a slight $SO_2$ odor and analyzing 4.3% sulfur. The yield of final product based on the starch xanthide was 87.8%.

Example 2

A starch dithiocarbonate disulfide was prepared from a corn starch in the same manner specified in Example 1, except that the ratio of ingredients used was 1 mole starch:1 mole NaOH:1 mole $CS_2$. The resulting starch xanthate was reacted with 1.9 moles of NaOCl in the manner specified in Example 1. Twenty and 2/10 g. of $ClO_2$ were consumed during the conversion of the starch xanthate to the starch monothiocarbonate disulfide. The resulting white product contained 10% moisture and analyzed 3.83% sulfur. The yield of product based on the starch employed was 96%.

Example 3

Run A: Process of the invention.—Starch xanthate was prepared in the manner set forth in Example 1 by reaction of starch, carbon bisulfide and NaOH in the ratio of 1 mole starch: 1 mole NaOH:0.6 mole $CS_2$. The resulting starch xanthate was converted to starch xanthide using about a mole of NaOCl per every 0.6 mole of $CS_2$ reacted in preparing the xanthate. The procedure followed was identical to that set forth in Example 1. A five gram sample of the resulting air dried xanthide was treated with a 200 ml. solution containing 4.2 g. of $ClO_2$ at a pH of 3.5 to 4.5. The reactions were carried out in the manner set forth in Example 1 at room temperature with occasional stirring. Thereafter, the mixture was washed free of impurities and was dried. The theoretical sulfur content of starch monothiocarbonate disulfide derived from the above starch xanthide precursor is 2.0. The sulfur analysis of the final product is set forth in Table I.

Run B: Oxidation of xanthide using $H_2O_2$.—The above procedure was repeated except that in place of chlorine dioxide a 200 ml. solution of 6% $H_2O_2$ having a pH of 6.0 to 6.5 was used to carry out the oxidation. The sulfur content of the resultant product is set forth in Table I.

Run C: Oxidation of xanthide using NaOCl.—The above procedure was repeated except that in place of chlorine dioxide a 200 ml. solution of 5.2% of NaOCl having a pH of 5.5 to 6.5 was employed to carry out the oxidation of the xanthide.

The sulfur content of the resulting product is set forth in Table I.

TABLE I

| Sample | Oxidant | Percent Sulfur |
|---|---|---|
| Blank | None | 4.45 |
| A | $ClO_2$ | [1] 2.0 |
| B | $H_2O_2$ | 3.38 |
| C | NaOCl | [2] 1.27 |

[1] Theoretical sulfur content of starch monothiocarbonate disulfide is 2.0%.
[2] Qualitative infrared spectral analysis indicated that NaOCl treatment produced degraded starch products.

As will be seen from the above table, in Run B hydrogen peroxide was unable to oxidize the bulk of the starch xanthide to starch monothiocarbonate disulfide. On the other hand, sodium hypochlorite caused severe attack of the starch xanthide resulting in degradation products and undesired loss of sulfur from the oxidized product. In Run A wherein chlorine dioxide was used as the oxidant, complete conversion to the desired product was obtained without forming starch degradation products.

Example 4

Twenty-five grams of unbleached kraft pulp was disintegrated in 1400 ml. of tap water in a standard disintegrator. To this mixture was added 0.22%, based on the weight of the pulp, of a cationic resin, Kymene 557, a polyamide-polyamine-epichlorhydrin polymer having the formula:

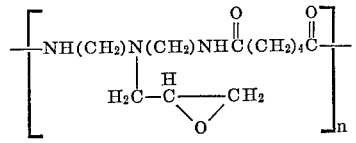

The pulp slurry had a pH of between 7.8 and 8.3. A second mixture was made up by adding 600 ml. of tap water into a Waring Blendor along with 3% of starch monothiocarbonate disulfide (MTDS). The MTDS was prepared as set forth in Example 1 and had a sulfur content of 3.83%. The percentage of MTDS added was based on the amount of pulp present in the final mixture. The MTDS aqueous mixture was dispersed in the Waring Blendor for ten minutes and then added to the pulp slurry in the standard disintegrator. Handsheets were then formed in a sheet mold using the above pulp mixture along with recycled tap water having a pH of 7.8 to 8.2. These handsheets were drum cured for 30 minutes at 240° F.

Additional handsheets were made up in the same manner as described above except that no MTDS was added. One series of handsheets (blanks) were made up containing neither Kymene 557 or MTDS. All of the handsheets were then tested for physical properties as set forth in TAPPI T–220m–60. The results of these tests are set forth in Table II.

The above cured handsheets were subjected to a 14-day aging test at 100° F. and 80% relative humidity. The samples were then retested. There was substantially no loss in the improved properties of the cured handsheets containing the MTDS.

TABLE II

| Sample Number | Percent Added Based on Pulp | | Tensiles (meters) | | Burst Factors | | Tear Factor | |
|---|---|---|---|---|---|---|---|---|
| | Kymene 557 | MTDS | Dry | Wet | Dry | Wet | Dry | Wet |
| C1613-142 | 0 | 0 | 7,800 | 210 | 73 | 5 | 237 | 71 |
| C1613-143 | .23 | 0 | 8,400 | 1,760 | 83 | 26 | 208 | 283 |
| C1744-3 | .23 | 3 | 9,400 | 1,820 | 87 | 30 | 268 | 328 |

Example 5

Twenty-five grams of a mixture of 60% bleached softwood sulfite pulp and 40% softwood kraft pulp (CSF= 660) were disintegrated in 1400 ml. of tap water in a standard disintegrator. To this mixture was added 0.32% (based on the weight of the pulp) of a cationic resin, Kymene 557. The pulp slurry had a pH between 7.8 and 8.3. A second mixture was made up by adding 600 ml. of tap water into a Waring Blendor along with 3% of starch monothiocarbonate disulfide (MTDS). The MTDS was prepared as set forth in Example 1 and had a sulfur content of 3.83%. The percentage of MTDS added was based on the amount of pulp present in the final mixture. The MTDS aqueous mixture was dispersed in the Waring Blendor for ten minutes and then added to the pulp slurry in the standard disintegrator. Handsheets were then formed in a sheet mold using the above pulp mixture along with recycled tap water having a pH of 7.8 to 8.2. These handsheets were drum cured for 30 minutes at 40° F. Additional handsheets were made as set forth above using increased amounts of Kymene 557 as set forth in Table III.

Additional handsheets were made up in the same manner as described above except that no MTDS was added. One series of handsheets (blanks) were made up containing neither Kymene 557 or MTDS. All of the handsheets were then tested for physical properties as set forth in TAPPI T–220m–60. The results of these tests are set forth in Table III.

TABLE III

| Sample Number | Percent Added Based on Pulp | | Tensiles (meters) | | Burst Factors | | Tear Factor | |
|---|---|---|---|---|---|---|---|---|
| | Kymene 557 | MTDS | Dry | Wet | Dry | Wet | Dry | Wet |
| C1744-33 | 0 | 0 | 2,300 | ------ | 13 | 4 | 140 | 33 |
| C1895-22 | .2 | 0 | 2,800 | 540 | 18 | 5 | 123 | 72 |
| C1744-34 | .32 | 0 | 2,850 | 730 | 19 | 7 | 135 | 114 |
| C1744-35 | .64 | 0 | 3,100 | 840 | 19 | 10 | 137 | 122 |
| C1744-36 | 1.3 | 0 | 3,300 | 1,020 | 24 | 11 | 137 | 137 |
| C1895-25 | .2 | 2 | 3,600 | 680 | 31 | 9 | 134 | 103 |
| C1744-38 | .32 | 3 | 3,800 | 730 | 31 | 9 | 122 | 104 |
| C1744-39 | .64 | 3 | 4,000 | 1,000 | 36 | 11 | 124 | 124 |
| C1744-40 | 1.30 | 3 | 4,150 | 1,220 | 40 | 13 | 124 | 124 |

Example 6

Twenty-five grams of unbleached kraft pulp (CSF= 530) from southern pine were disintegrated in 1400 ml. of tap water in a standard disintegrator to yield a pulp slurry having a pH between 7.8 and 8.3. A second mixture was made up by adding 600 ml. of tap water into a Waring Blendor along with 3% of starch monothiocarbonate disulfide (MTDS). The MTDS was prepared as set forth in Example 1 and had a sulfur content of 3.83%. The percentage of MTDS added was based on the amount of pulp present in the final mixture. The MTDS aqueous mixture was dispersed in the Waring Blendor for ten minutes and then added to the pulp slurry in the standard disintegrator. Handsheets were then formed in a sheet mold using the above pulp mixture along with recycled tap water having a pH of 7.8 to 8.2. These handsheets were drum dried for 30 minutes at 40° F. and then tested for physical properties as set forth in TAPPI T–220m–60. The results of the test are set forth in Table IV.

TABLE IV

| Percent Added Based on Pulp | | Tensiles (meters) | | Burst Factor | | Tear Factor | |
|---|---|---|---|---|---|---|---|
| Kymene 557 | MTDS | Dry | Wet | Dry | Wet | Dry | We |
| 0 | 0 | 7,800 | 210 | 73 | 5 | 237 | 71 |
| 0 | 3 | 7,800 | 395 | 79 | 4 | 288 | 100 |

Example 7

An unbleached kraft pulp (CSF=580) from southern pine was prepared into handsheets according to Example 6. A second mixture was prepared to contain 3% of monothiocarbonate disulfide (MTDS) based on the dry pulp. The MTDS sample had a sulfur content of 4.3%.

The dry handsheets were sprayed with dilute acidified formaldehyde solution and dried at different temperatures. The results of the test are shown in Table V.

TABLE V

| Sample Number | Percent Added Based on Pulp (MTDS) | Curing Conditions | Tensiles(meters) | |
|---|---|---|---|---|
| | | | Dry | Wet |
| C1613-57A | 0 | 320° F., 2 mins., pH=4.0, .9% HCHO. | 7,000 | 265 |
| C1613-57 | 3 | 320° F., 2 mins., pH=4.0, .9% HCHO. | 7,300 | 970 |
| C1613-71A | 0 | 320° F., 2 mins., pH=4.0, 1.8% HCHO. | 7,100 | 360 |
| C1613-71 | 3 | 320° F., 2 mins., pH=4.0, 1.8% HCHO. | 8,490 | 1,780 |

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Starch monothiocarbonate disulfide having the formula:

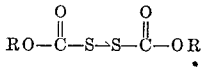

wherein RO represents α-anhydroglucose units of a starch molecule.

2. Process of producing a starch monothiocarbonate disulfide having the formula:

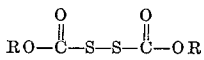

wherein RO represents the α-anhydroglucose unit of a starch molecule which comprises reacting starch dithiocarbonate disulfide with stoichiometric amounts of chlorine dioxide at a temperature of from 0° to 60° C. and at a pH of from 1 to 6, and recovering a starch monothiocarbonate disulfide.

3. Process of claim 2 wherein the reaction is carried out at a temperature of 10° to 30° C. and at a pH of 3.5 to 4.5.

4. Process of increasing the strength of paper which comprises adding a starch monothiocarbonate disulfide having the formula:

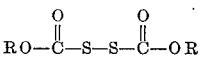

wherein in RO represents α-anhydroglucose units of a starch molecule, in amounts of at least about 1%, based on the weight of the pulp, to a pulp slurry, forming paper from said slurry and recovering a paper having increased strength in which cellulosic fibers are bonded by means of said retained monothiocarbonate disulfide.

5. Process of claim 4 wherein the starch monothiocarbonate disulfide is present in amounts of from 2 to 5% based on the weight of the pulp.

6. A paper comprising cellulosic fibers bonded together by at least 1%, based on the weight of the fibers of a starch monothiocarbonate disulfide having the formula:

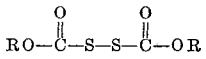

wherein RO represents α-anhydroglucose units of a starch molecule.

References Cited

UNITED STATES PATENTS 3,160,552  12/1964  Russell et al. _____ 162—175 X
3,304,223  2/1967   Wheeler _____ 162—175
3,335,023  8/1967   Bridgeford _____ 117—156

S. LEON BASHORE, *Primary Examiner.*